United States Patent
O'Donnell et al.

(10) Patent No.: US 8,052,820 B2
(45) Date of Patent: Nov. 8, 2011

(54) METHOD OF MAKING A LOAD BEARING MEMBER FOR AN ELEVATOR SYSTEM

(75) Inventors: Hugh O'Donnell, Longmeadow, MA (US); Hubert E. Goeser, Dannenberg (DE)

(73) Assignee: Otis Elevator Company, Farmington, CT (US)

( * ) Notice: Subject to any disclaimer, the term of this patent is extended or adjusted under 35 U.S.C. 154(b) by 816 days.

(21) Appl. No.: 12/066,389

(22) PCT Filed: Sep. 13, 2005

(86) PCT No.: PCT/US2005/032413
§ 371 (c)(1),
(2), (4) Date: Mar. 11, 2008

(87) PCT Pub. No.: WO2007/032763
PCT Pub. Date: Mar. 22, 2007

(65) Prior Publication Data
US 2008/0226910 A1    Sep. 18, 2008

(51) Int. Cl.
*B32B 37/04* (2006.01)
*B66B 11/00* (2006.01)
*B66B 11/08* (2006.01)

(52) U.S. Cl. .............. 156/179; 156/244.11; 156/244.12; 156/308.2; 156/309.6; 187/411

(58) Field of Classification Search .................. 156/166, 156/176, 178, 179, 244.11–244.27, 308.2, 156/320, 322, 309.6, 309.9; 57/212, 217, 57/3, 17, 295, 241, 242, 258; 187/251, 403, 187/411
See application file for complete search history.

(56) References Cited

U.S. PATENT DOCUMENTS 3,222,237 A * 12/1965 McKelvy ...................... 156/177
3,833,755 A *  9/1974 Soelberg .................... 174/117 F
4,097,324 A *  6/1978 Emmel ......................... 156/179
(Continued)

FOREIGN PATENT DOCUMENTS

DE    3821172 A1    1/1989

OTHER PUBLICATIONS

International Preliminary Report on Patentability for International application No. PCT/US05/32413 mailed Aug. 5, 2008.

(Continued)

*Primary Examiner* — Katarzyna Wyrozebski Lee
*Assistant Examiner* — Scott W Dodds
(74) *Attorney, Agent, or Firm* — Carlson, Gaskey & Olds PC

(57) ABSTRACT

A method of making a load bearing member (30) for an elevator system (20) includes placing at least one tension member (32) adjacent one side (60) of a first layer (36) of a polymer material. A second layer (38), comprising a urethane in a disclosed example, is added adjacent to at least the one side (60) of the first layer (36) such that the tension member (32) is between the first layer (36) and the second layer (38). Such a technique allows for eliminating the bridges typically used to support the tension members in molding devices. Eliminating such bridges eliminates the resulting grooves associated with previous arrangements. Providing a grooveless exterior on the jacket (34) of the load bearing member (30) eliminates a significant source of potential vibration and noise in an elevator system.

10 Claims, 2 Drawing Sheets

U.S. PATENT DOCUMENTS

| | | | |
|---|---|---|---|
| 4,361,456 A * | 11/1982 | Reschke | 156/179 |
| 4,411,947 A | 10/1983 | Heynhold | |
| 4,444,709 A * | 4/1984 | Hayashi et al. | 264/171.21 |
| 4,538,024 A * | 8/1985 | Wise et al. | 174/117 F |
| 5,112,933 A | 5/1992 | O'Donnell et al. | |
| 5,242,637 A | 9/1993 | Inoue et al. | |
| 5,665,295 A | 9/1997 | Takamoto et al. | |
| 5,698,302 A | 12/1997 | Brandon et al. | |
| 5,958,570 A * | 9/1999 | Schwambach et al. | 428/217 |
| 6,295,799 B1 | 10/2001 | Baranda | |
| 6,672,046 B1 * | 1/2004 | Prewo et al. | 57/232 |
| 6,739,433 B1 * | 5/2004 | Baranda et al. | 187/411 |
| 7,926,649 B2 | 4/2011 | Goser | |
| 2002/0000347 A1 * | 1/2002 | Baranda et al. | 187/254 |

OTHER PUBLICATIONS

International Search Report and Written Opinion of the International Searching Authority for International application No. PCT/US05/32413 mailed Mar. 15, 2006.

Supplementary European Search Report for Application No. EP 05 79 6614 mailed Aug. 19, 2010.

* cited by examiner

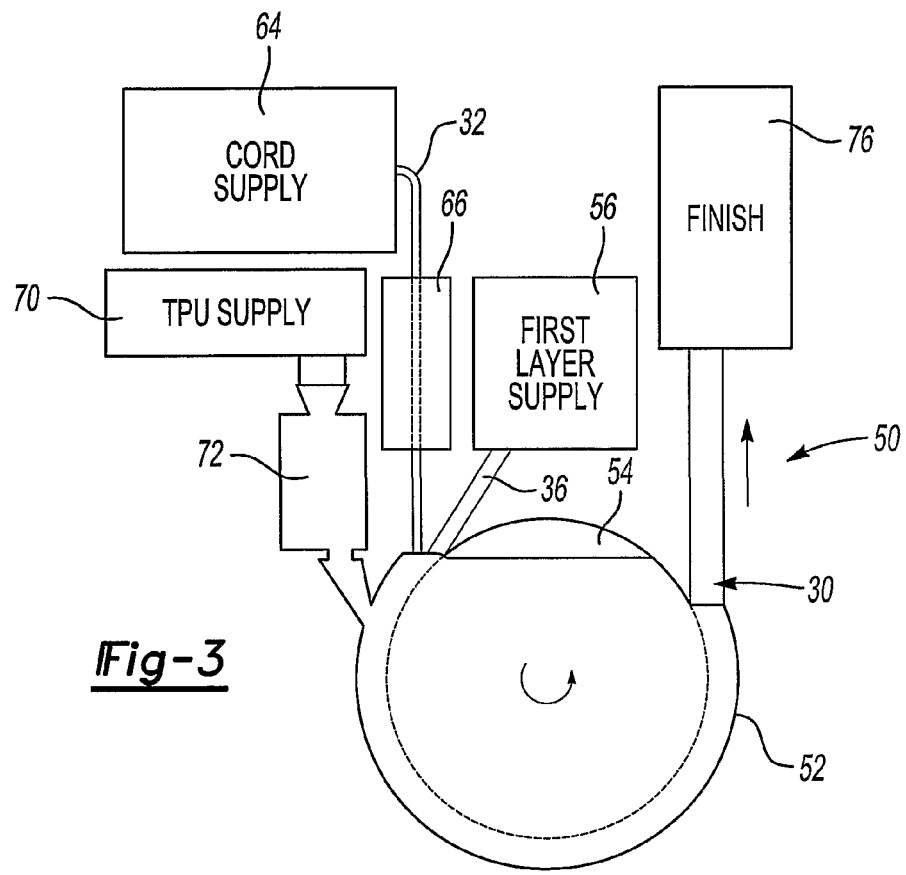
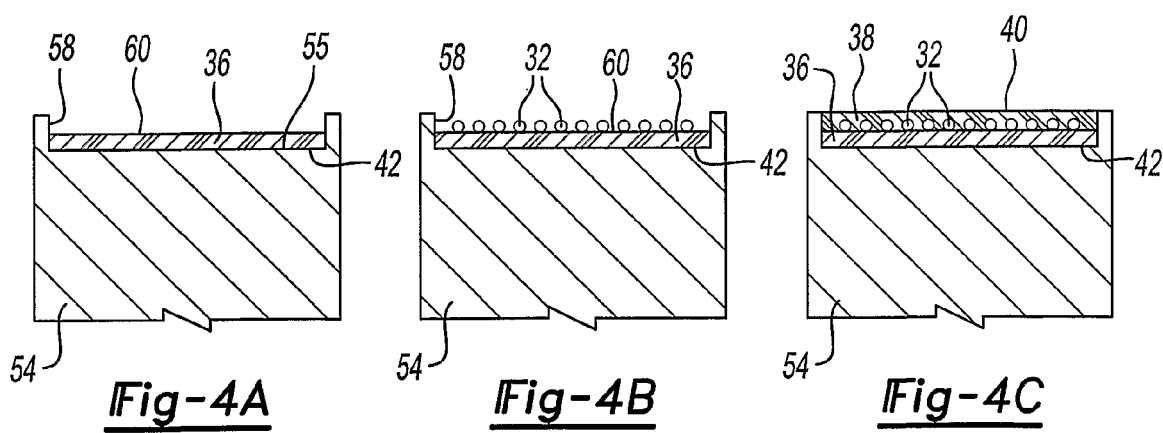

METHOD OF MAKING A LOAD BEARING MEMBER FOR AN ELEVATOR SYSTEM

1. FIELD OF THE INVENTION

This invention generally relates to elevator systems. More particularly, this invention relates to a load bearing member for elevator systems.

2. DESCRIPTION OF THE RELATED ART

There are several known types of elevator systems. Traction-based systems typically include an elevator car, a counterweight and load bearing members that support the car and counterweight. The car moves between different levels because of traction between the load bearing members and a traction sheave, for example.

Elevator system load bearing members come in various forms. For many years steel ropes were used. More recently, other load bearing members have been introduced. Some examples include flat belts having a plurality of tension members encased in a urethane jacket. Some examples include steel cords as the tension members while others include aramid materials as the tension members.

Regardless of the selected materials, known manufacturing methods typically result in a plurality of grooves in at least one exterior surface of the jacket. These grooves result from known manufacturing processes.

One difficulty associated with such grooves is that they tend to introduce noise and vibration during elevator system operation as the grooves contact the traction sheave, for example. Various arrangements have been proposed for minimizing the vibration and noise-generating effects of such grooves.

It would be beneficial to be able to eliminate the grooves entirely. This invention addresses that need.

SUMMARY OF THE INVENTION

An example load bearing member for use in an elevator system includes at least one tension member and a jacket generally surrounding the tension member. The jacket does not have any exterior grooves.

The jacket in one example is made by a process including placing at least one tension member adjacent one side of a first jacket layer comprising a polymer and adding a second jacket layer comprising a urethane to at least the one side of the first jacket layer such that the tension member is between the first and second layers.

In one example, the tension member comprises a plurality of steel cords. In one example, there are a plurality of tension members.

In one example, the first and second layers are made from the same material comprising urethane. In another example, different materials are selected for each of the layers. In one example, the different materials have different friction characteristics.

An example method of making a load bearing member for use in an elevator system includes placing at least one tension member adjacent one side of a first jacket layer comprising a polymer. Adding a second layer comprising urethane to at least the one side of the first layer completes the load bearing member with the tension member between the first and second layers.

In one example, the method includes heating the tension member sufficiently to cause at least partial melting of the first layer in the vicinity of the tension member. This ensures a good bond between the tension member and the first layer, for example.

In one example, the second layer is extruded onto the first layer. The temperature of the extruded material is sufficient to provide bonding between the first and second layers.

The various features and advantages of this invention will become apparent to those skilled in the art from the following description of a currently preferred embodiment. The drawings that accompany the detailed description can be briefly described as follows.

BRIEF DESCRIPTION OF THE DRAWINGS

FIG. 3 schematically illustrates an arrangement for making one example embodiment of a load bearing member.

FIGS. 4A-4C schematically illustrate selected features of an example manufacturing process.

DETAILED DESCRIPTION OF THE PREFERRED EMBODIMENT

Figure 1:
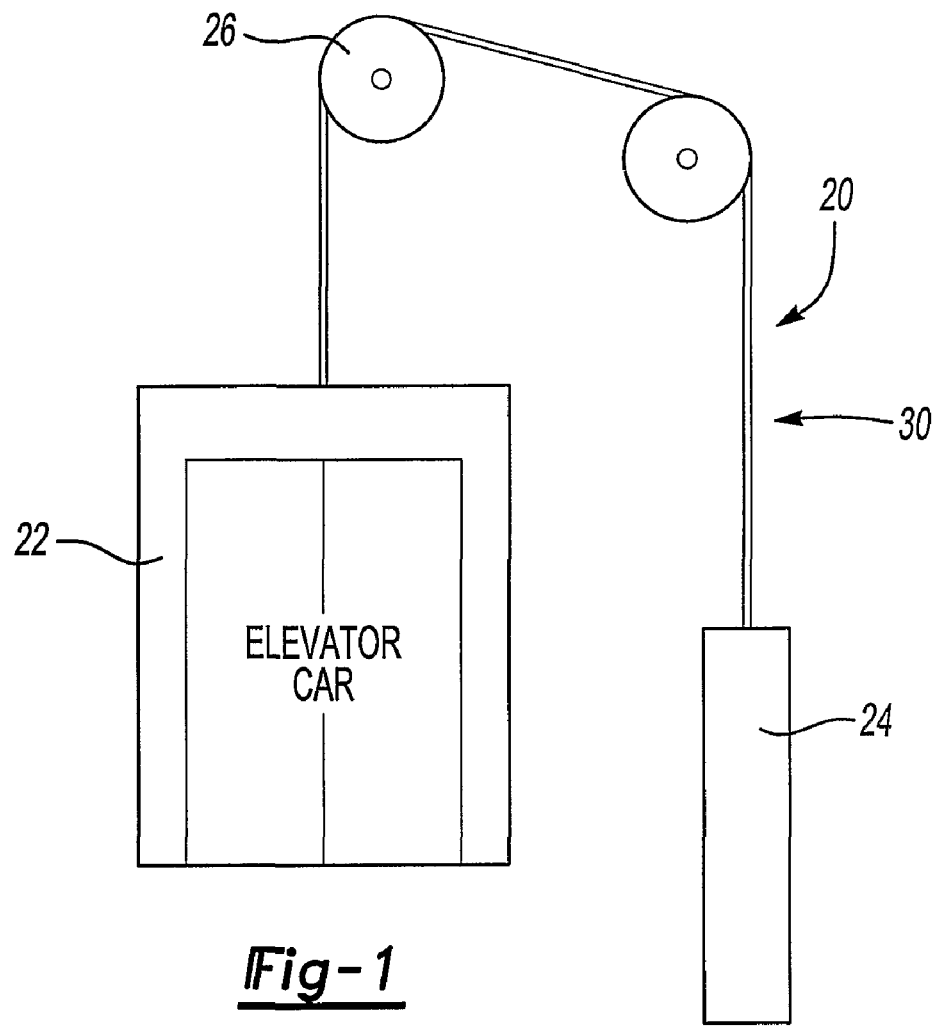
FIG. 1 schematically shows selected portions of an elevator system.

FIG. 1 schematically shows selected portions of an elevator system 20. An elevator car 22 and a counterweight 24 are suspended by a load bearing member 30. Traction between the load bearing member 30 and a traction sheave 26 allows desired movement of the elevator car 22 as known.

Figure 2:
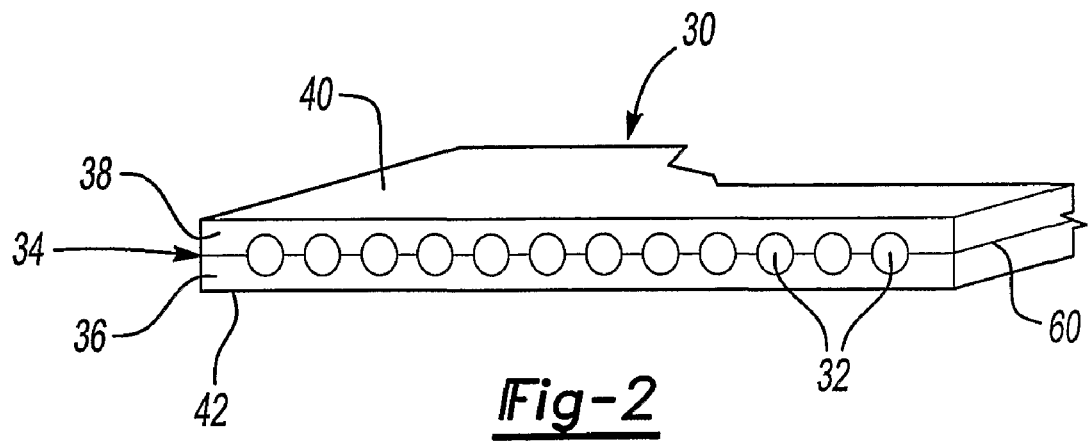
FIG. 2 is a schematic, perspective end view of an example embodiment of a load bearing member.

FIG. 2 shows an end view of one example load bearing member 30 designed according to an embodiment of this invention. In the example of FIG. 2, a plurality of tension members 32 are encased in a jacket 34 that comprises urethane. In the illustrated example, a first layer 36 comprises a polymer, which includes a urethane in some examples. Other example polymers include polypropylene and polyethylene. A second layer 38 comprises urethane in some examples. In one example, the first and second layers are different from each other in some respect. In another example, the same material is used for both layers.

The illustrated example is a flat belt. This invention is not limited to a particular geometry or configuration of the load bearing member 30.

One feature of the illustrated example is that an exterior surface 40 of the second layer 38 does not include any grooves. In other words, the exterior surface 40 is grooveless. This is different than known arrangements where grooves that are generally perpendicular to the length of the load bearing member 30 are spaced along at least one exterior surface of the jacket.

Similarly, an exterior surface 42 of the first layer 36 does not have any grooves.

In one example, one or both of the exterior surfaces 40 and 42 may be textured to provide a desired friction characteristic, for example. In general, a smooth, grooveless exterior surface provides sufficient traction characteristics and avoids noise generation that has been associated with load bearing members that include exterior grooves on a jacket.

FIG. 3 schematically shows an arrangement 50 for making the example embodiment of FIG. 2. A molding device 52 includes a mold wheel 54. The mold wheel 54 in this example differs from conventional mold wheels used for making coated steel belts, for example. While such traditional mold wheels had a plurality of bridges for supporting the tension members 32 during the molding process, the surface 55 (FIG.

4A) of the mold wheel 54 does not have any such bridges. In this example, the outer surface 55 of the mold wheel 54 supports the first layer 36. In one example, the first layer 36 is premade and provided from a first layer supply 56 such as a reel. The first layer 36 in this example is preformed to have a desired width and thickness corresponding to a finish width of the load bearing member 30.

As schematically shown in FIG. 4A, the first layer 36 is received within a well 58 on the mold wheel 54. In this position, one side 60 of the first layer 36 is facing outward relative to a center of the mold wheel 54.

The tension member 32 is provided from a supply 64 such as a reel, for example. In one example, a plurality of reels of steel cords are fed into the mold 52 along with the first layer 36. The first layer 36 is supported on the exterior surface 55 of the mold wheel 54 and the tension members 32 are supported on the first layer 36. This is schematically shown, for example, in FIG. 4B. The tension members 32 are received against the one side 60 of the first layer 36 in this example.

In the example of FIG. 3, a heater 66 heats the tension members 32 before they enter the mold 52. The heated tension members cause localized melting of at least a portion of the first layer 36 in the vicinity of the tension members 32. Such partial melting provides for bonding the tension members 32 to the first layer 36 and provides a desired pull out strength. Various heater devices may be used to increase the temperature of the tension members 32 to meet the needs of a particular situation.

In the example of FIG. 3, a supply 70 of a urethane material feeds the material into an extruder 72. The urethane material from the supply 70 is then extruded into the mold 52 to form the second layer 38 within the mold 52. This is one example way of adding a second layer 38 to the first layer 36.

FIG. 4C schematically shows the first layer 36, the tension members 32 and the second layer 38 as formed within the mold 52.

The load bearing member 30 exits the mold 52 and is finished in a known manner in a finishing station 76. One example includes a cooling bath for cooling the polymer materials of the jacket 34. Any surface texturing or dimensional controls can be accomplished in a known manner within the finishing station 76.

Utilizing a first layer 36 of a jacket to support at least one tension member 32 within a mold eliminates the need for using bridges associated with conventional molding techniques for supporting the tension member 32 within the mold. Eliminating such bridges eliminates the resulting grooves that are associated with conventional arrangements. Accordingly, the disclosed example provides the advantage of being able to have an exterior jacket 34 of a load bearing member 30 with grooveless exterior surfaces (facing opposite from each other in the case of a flat belt, for example). Having a grooveless exterior surface eliminates a significant source of potential noise and vibration in an elevator system.

In one example, the materials selected for the first layer 36 and the second layer 38 are selected based upon friction characteristics of those materials. In one example, different materials are selected to have different friction characteristics for the exterior surfaces 40 and 42, respectively. In another example, at least one of the materials for at least one of the layers has a different color than the other. In still another example, at least one of the materials selected for at least one of the layers has a characteristic that facilitates visual inspection techniques that can be used for determining a condition of the load bearing member 30 within an elevator system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a load bearing member for use in an elevator system, comprising the steps of:
   (A) heating at least one elongated steel cord tension member that is configured to support a load of an elevator car in an elevator system;
   (B) placing the heated tension member adjacent one side of a first jacket layer that is against a substrate;
   (C) at least partially melting the first jacket layer in the vicinity of the heated tension member such that the tension member at least partially penetrates the first jacket layer;
   (D) subsequently adding a second jacket layer adjacent to at least the one side of the first jacket layer such that the elongated tension member is between the first and second jacket layers;
   (E) wherein the second jacket layer is at least partially melted in the vicinity of the heated tension member such that the tension member at least partially penetrates the second jacket layer; and
   (F) securing the first and second jacket layers together such that the resulting load bearing member has a planar traction surface configured to contact a traction sheave in an elevator system.

2. The method of claim 1, wherein step (D) includes extruding the second jacket layer onto the one side of the first jacket layer.

3. The method of claim 1, wherein step (F) includes using a temperature of at least a portion of at least one of the first or second jacket layers sufficient to cause at least partial melting of at least one of the layers to thereby bond the first and second layers together.

4. The method of claim 1, wherein step (B) includes using a preformed first jacket layer and supporting the tension member on the one side of the first jacket layer.

5. The method of claim 4, wherein step (B) includes supporting the preformed first jacket layer on a mold wheel with the one side facing away from an axis of rotation of the mold wheel.

6. The method of claim 1, including using a plurality of tension members.

7. The method of claim 1, wherein the first jacket layer comprises a polymer and the second jacket layer comprises urethane.

8. The method of claim 7, wherein the polymer comprises urethane.

9. The method of claim 8, wherein the first jacket layer is different than the second jacket layer.

10. The method of claim 1, wherein the first jacket layer has a first friction characteristic and the second jacket layer has a second, different friction characteristic.

* * * * *